No. 740,292.   PATENTED SEPT. 29, 1903.
R. H. LIBBY.
FRUIT PICKER.
APPLICATION FILED DEC. 26, 1902.
NO MODEL.

Witnesses
T. P. Brett
Harry Ellis Chandlee

Inventor
R. H. Libby
By Chandlee & Chandlee
Attorneys

No. 740,292. Patented September 29, 1903.

UNITED STATES PATENT OFFICE.

ROBERT H. LIBBY, OF MARSHFIELD CENTER, MASSACHUSETTS.

FRUIT-PICKER.

SPECIFICATION forming part of Letters Patent No. 740,292, dated September 29, 1903.

Application filed December 26, 1902. Serial No. 136,661. (No model.)

*To all whom it may concern:*

Be it known that I, ROBERT H. LIBBY, a citizen of the United States, residing at Marshfield Center, in the county of Plymouth, State of Massachusetts, have invented certain new and useful Improvements in Fruit-Pickers; and I do hereby declare the following to be a full, clear, and exact description of the invention, such as will enable others skilled in the art to which it appertains to make and use the same.

This invention relates to fruit-pickers; and it has for its object to provide a picker with which the fruit may be easily detached from the tree and will be caught, so as not to be injured in dropping, a further and highly-important object of the invention being to provide a picker which may be manipulated in different directions to detach the fruit, as may be dictated by the peculiar position of the fruit or the obstructing limbs or branches.

Other objects and advantages of the invention will be understood from the following description.

Figure 1:
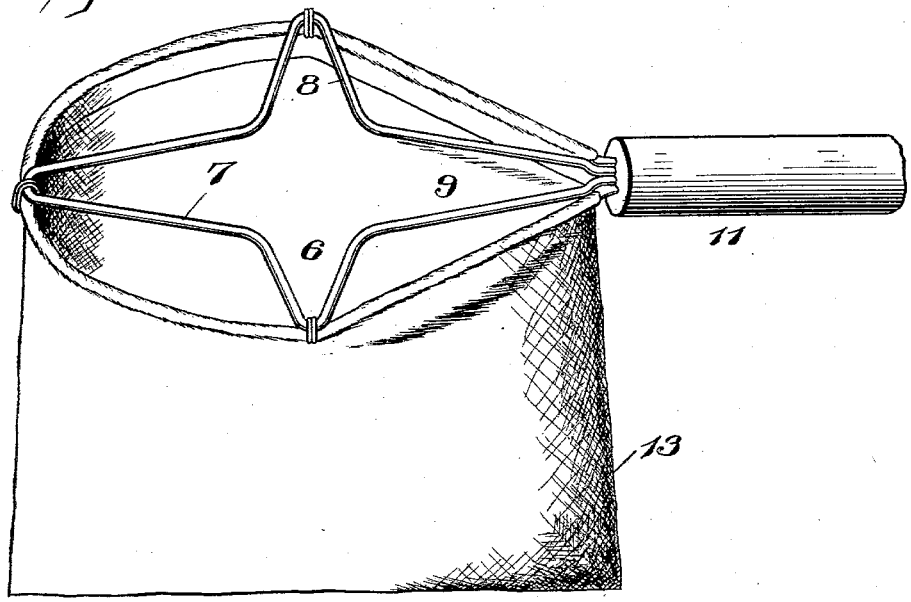
Figure 2:
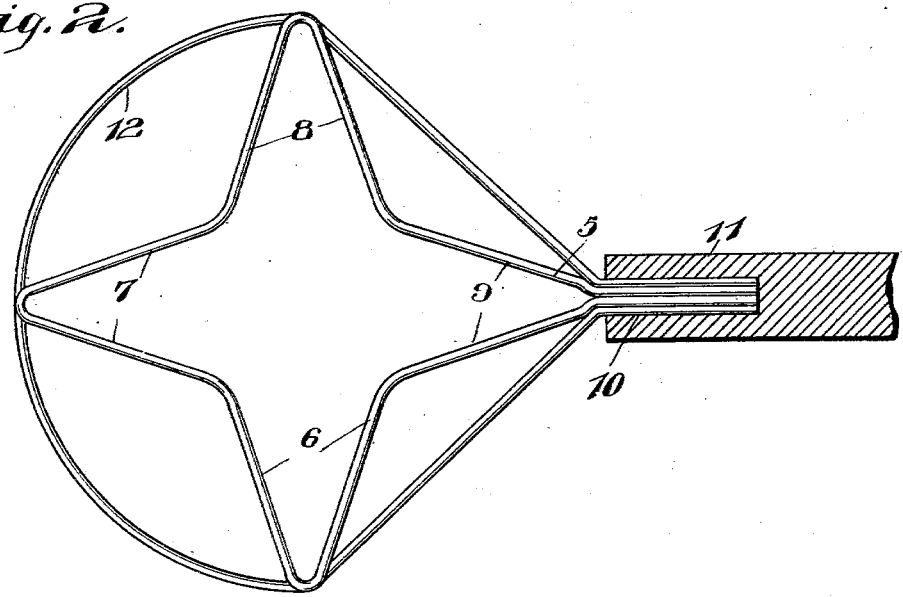

In the drawings forming a portion of this specification, and in which like numerals of reference indicate similar parts in the several views, Figure 1 is a perspective view showing a fruit-picker embodying the present invention. Fig. 2 is a plan view showing the detaching-frame and the bag-frame, the handle being shown in section.

Referring now to the drawings, the present picker comprises what may be termed a "detaching-frame" or "picking-frame," consisting of a rod or wire 5, which is bent to form a star-shaped head portion having the four sets of convergent sides 6, 7, 8, and 9, the sides 9 being continued beyond the corresponding point of the star in parallel relation and engaged with the socket 10 of a handle 11. The entire picking-frame lies in a single plane, and the separation of the reëntrant angles of the frame is such as to permit of passage therebetween of the fruit to be picked.

In connection with the picker-frame is employed an oval-shaped bag-frame 12, to which is secured a sack or bag 13, said frame being disposed within the mouth of the sack or bag and the edge of the latter being turned inwardly over the frame and sewed in place. The bag-frame touches the angles of the star-shaped picker-frame and is wired or otherwise attached thereto, the ends of the oval-shaped bag-frame being engaged in the handle beside the engaging ends of the wire forming the picker-frame. With this specific shape of picker-frame it will be seen that in detaching the fruit it may be manipulated to receive the fruit through the central portion of the frame and may be then moved laterally in either direction or forwardly or backwardly to engage the sides of the corresponding point of the star-shaped frame close to the stem and above the fruit, thus permitting of operation of the picker under conditions of obstruction that would prevent operative movement of the picker in any but one direction. It will be understood that when the fruit is detached from the limb it falls into the bag or sack and may be then lowered and removed by hand.

In the picking of fruit it is often found necessary to manipulate the picker in such manner as to subject the frame of the picker to bending strain, and an object of the present invention is to form a picker in which the picking-frame will be thoroughly braced and will not be liable to be bent. In the use of the hoop or oval bag-frame the picking-frame is thoroughly braced and, furthermore, in the manipulation of the picker the exceedingly-ripe fruit may be entered between the fruit-frame proper and the bag-frame, so that by turning the picker to one side the fruit will not drop unobstructedly to the bottom of the bag, but will drop against the side of the bag, so that the fruit will not be so liable to be bruised. This point is of particular advantage when it is desired to pick a number of pieces of fruit before emptying the bag.

What is claimed is—

A fruit-picker consisting of a star-shaped picker-frame having a handle attached thereto, a bracing-hoop attached to the picker-frame at the outer points thereof and bowed outwardly between its points of attachment, forming fruit-receiving openings, and a bag attached to the bracing-frame by binding the edge of its mouth over the frame.

In testimony whereof I affix my signature in presence of two witnesses.

ROBERT H. LIBBY.

Witnesses:
EDWARD J. JONES,
MARGUERITE B. MATSON.